(12) United States Patent
Garner et al.

(10) Patent No.: US 6,672,011 B2
(45) Date of Patent: Jan. 6, 2004

(54) MODULAR COMMAND POST SYSTEM

(75) Inventors: Paul N. Garner, Millersville, MD (US); Lynn J. Adams, Sykesville, MD (US); Charles P. Richards, Clarksburg, MD (US)

(73) Assignee: Solipsys Corporation, Laurel, MD (US)

( * ) Notice: Subject to any disclaimer, the term of this patent is extended or adjusted under 35 U.S.C. 154(b) by 53 days.

(21) Appl. No.: 09/905,694

(22) Filed: Nov. 2, 2001

(65) Prior Publication Data

US 2003/0167698 A1 Sep. 11, 2003

(51) Int. Cl.[7] .................................................. E04H 3/10
(52) U.S. Cl. ................................. 52/6; 135/96; 135/124; 135/122; 135/900; 135/908; 403/12; 403/317; 108/155; 108/156; 297/16.1
(58) Field of Search ............................. 52/63, 173.1, 6; 135/96, 124, 122, 900, 908, 102; 24/456; 403/12, 13, 14, 315, 317, 326, 329, 373; 108/155, 156; 297/16.1; 411/522, 514, 521

(56) References Cited

U.S. PATENT DOCUMENTS

| 4,091,584 A | * | 5/1978 | Brown .......................... 52/86 |
| 4,121,604 A | * | 10/1978 | Rain ............................. 52/63 |
| D284,834 S | * | 7/1986 | Hoffstrom ................... 411/522 |
| 6,485,146 B2 | * | 11/2002 | Rodriguez, Jr. .............. 353/79 |

* cited by examiner

Primary Examiner—Czrl D. Friedman
Assistant Examiner—Nahid Amiri
(74) Attorney, Agent, or Firm—Katten Muchin Zavis Rosenman (57) ABSTRACT

A modular command post system comprised of removable interconnecting truss elements is provided. The modular command post system is configured to provide shelter and infrastructure to support various electronic equipment used by occupants of the command post.

20 Claims, 7 Drawing Sheets

MODULAR COMMAND POST SYSTEM

CROSS REFERENCE TO RELATED APPLICATIONS

This application claims priority to U.S. patent application Ser. No. 29/130,873, filed on Oct. 11, 2000, incorporated herein by reference.

BACKGROUND OF THE INVENTION

1. Field of the Invention

This invention relates to modular building structures. More particularly, this invention relates to a method and apparatus for modular building systems that are easily and quickly assembled and disassembled for use as, for example, a command post system.

2. Summary of the Prior Art

Modular building systems that are easily and quickly erected and torn down are a key element in situations where a temporary shelter must be provided. Typically in these situations, a limited amount of personnel and resources are available to help assemble and disassemble the shelter. In addition, especially in the case of military operations, storage and transportation of the elements of the temporary shelter to the site are of the utmost importance. Within the military, the use of tents and other soft sided structures have become necessary to provide the smallest and lightest structure possible, thereby easing storage and transportation requirements. Typically, these soft sided structures are rolled or folded up and stored in vehicles such as trucks or trailers for transportation to the site.

Once erected, it may be desirable to place various electronic equipment inside the temporary shelter. In the case of a modular command post used for military operations, these electronic devices could include for example, computers and video monitors., laptop computers, projectors, lights, radio equipment and the like. Provisions for electrical power and communication links are required for an effective modular command post. It is therefore a key consideration in the design and construction of such a modular structure, to provide a rugged, weather tight shelter that easily provides the necessary electrical infrastructure to support the various electronic equipment that may be installed therein.

A modular command post also allows the size of the structure to grow or shrink based on the needs of the situation. For example, a plurality of interlocking modular command post structures could be provided in situations where space for several dozen to several hundred occupants is required. In these situations, it is desirable to provide a structure that is easily reconfigured into myriad shapes and sizes. Common interconnecting structure and fastening devices would reduce assembly and disassembly time.

In a military setting, it is desirable to provide a modular command post system that enables occupants to efficiently receive and interpret information from various sources to improve situational awareness. Improved situational awareness allows the soldier to reach more effective command and control decisions and communicate these decisions to the necessary people up and down the chain of command. These modular command posts must be compact and lightweight, easy to assemble and disassemble, easy to reconfigure into various shapes and sizes and provide access to a multitude of electronic equipment.

SUMMARY OF THE INVENTION

A first general aspect of the present invention is provided by arranging a front truss member with a pair of spaced apart front vertical leg sections and a front horizontal roof section spaced apart from a back truss member, also having a pair of spaced apart back vertical leg sections and a back horizontal roof section. The front and back trusses are located a predetermined distance from each other to form a volume therebetween. A plurality of side truss members are affixed between the leg sections of the front and back truss members and a top truss member is affixed between the roof sections of the front and back truss members. An end truss member is affixed to the back truss' member and extends between the back vertical leg sections. A table truss member is affixed to the end truss member which extends substantially orthogonal to the end truss member. A table leg truss member is affixed substantially orthogonal between the table truss member and the ground to support the span of the table truss. A table surface is affixed to the table truss member in various patterns to provide a horizontal working surface.

Another general aspect of the present invention is provided by a temporary shelter for use by military personnel having a generally parallelpiped enclosure that is defined by a plurality of removably interconnecting truss members. A plurality of removable table surfaces are disposed inside the enclosure and a plurality of collapsible chairs are configured to be used in conjunction with a respective table surface. A removable viewing screen is positioned in optical communication with a removable projector inside the enclosure.

Yet another general aspect of the present invention is provided by a method for producing a temporary shelter comprising the steps of providing a front truss member that has spaced apart front vertical leg sections and a front horizontal roof section. A back truss member that has spaced apart back vertical leg sections and a back horizontal roof section is also provided and the back truss member is placed a predetermined distance from the front truss member. A plurality of side truss members are removably affixed between the front and back truss members. Further, a top truss member is removably:affixed between the front and back truss members and an end truss member is removably affixed to the back truss member which extends between the back vertical leg sections. A table truss member is removably affixed to the end truss member which extends substantially orthogonally from the end truss member. A table leg truss member is removably affixed substantially perpendicular between the table truss member and the ground and a table surface is removably affixed to the table truss member.

Yet another general aspect of the present invention is provided by a modular command post system comprising a collapsible three dimensional truss structure that defines a volume therein. A table support structure is removably affixed to the truss structure and extends in the volume. A plurality of horizontal work surfaces are removably affixed to the table support structure and a foldable electrical conduit structure is disposed along the table support structure, with the conduit structure routing a plurality of wires through the volume. Additionally, a plurality of removable vertical work surfaces are disposed in the volume.

Further aspects of the present invention will appear hereinbelow.

DETAILED DESCRIPTION OF THE PREFERRED EMBODIMENTS

FIGS. 1–4 show various views of a modular command post system of a preferred embodiment in accordance with the present invention. While the foregoing description will be primarily directed at a command post for use by military personnel, the invention is not so limited. The invention described herein could easily be adapted for use by, for example and not by limitation, emergency personnel responding to natural disasters, temporary retail structures, construction sites and the like.

Figure 1:
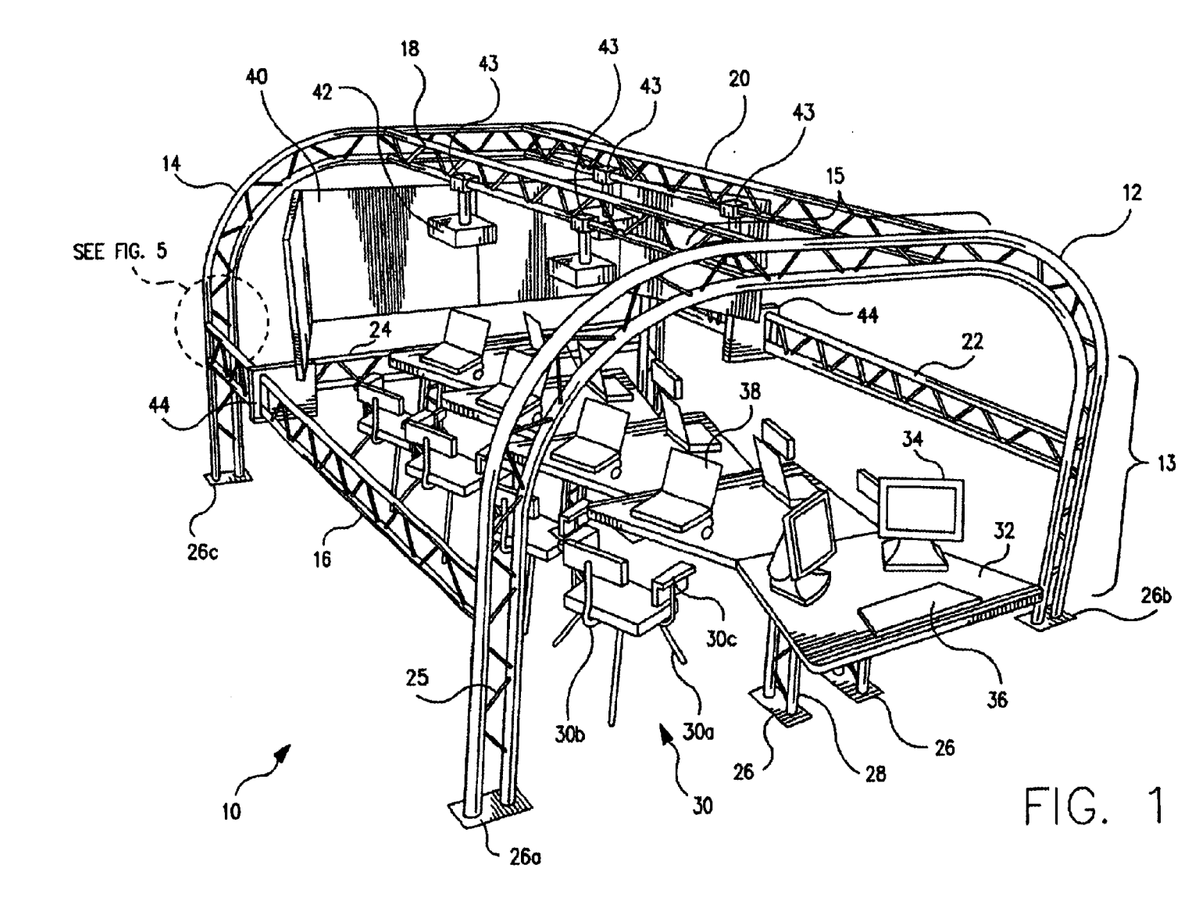
FIG. 1 is an isometric view of one embodiment in accordance with the present invention.
Figure 2:
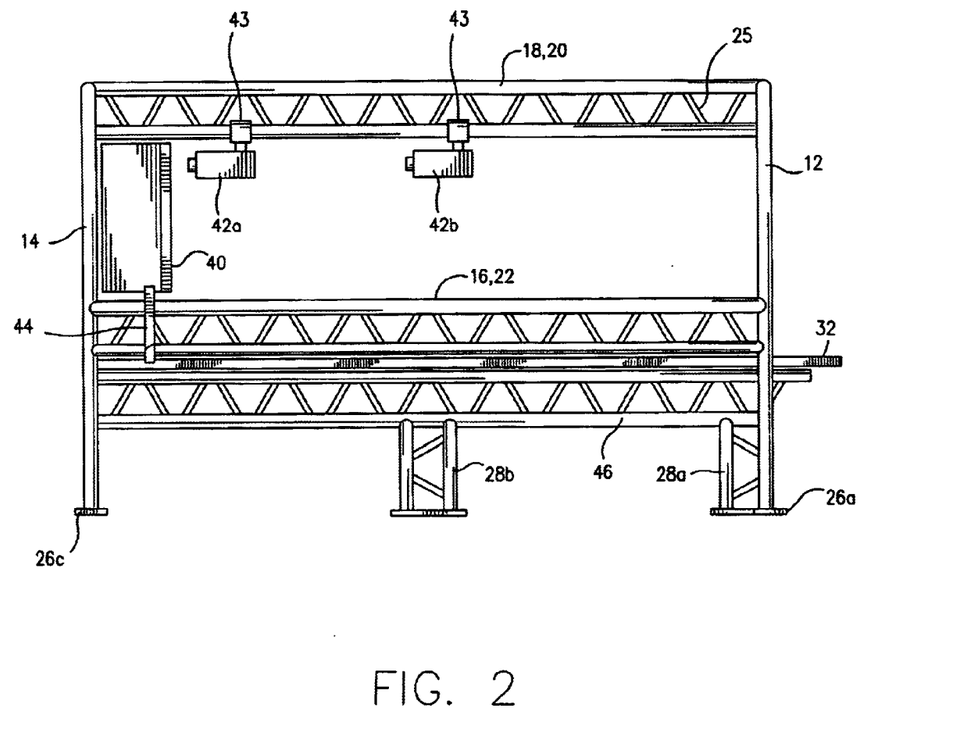
FIG. 2 is a side view of one embodiment in accordance with the present invention.

As shown in FIGS. 1–4, the modular command post system is comprised of an enclosed volume that is defined by a plurality of structural components that are connected together in a predetermined fashion. A front truss member 12 is placed in a spaced apart configuration from a back truss member 14. The front truss member 12 and back truss member 14 each have a pair of vertical leg portions 13 and a horizontal roof portion 15. In a preferred embodiment, the transition from the leg portion 13 to the roof portion 15 comprises a radius, but this transition could also be a 90 degree corner or any other well known arrangement. In a preferred embodiment, the front truss 12 and back truss 14 each comprise a pair of spaced apart parallel tubes connected together by a plurality of rods 25. This arrangement provides a lightweight, rigid truss member that is easy and cheap to manufacture. As shown in FIG. 1, the front truss member 12 and back truss member 14 are similar in shape. They could however be of different shapes if so desired. Making them of a similar shape allows for interchangeability of the two parts and eases construction of the command post.

A first and second side truss 16 and 22 respectively, extend orthogonal to and are affixed between respective leg portions 13 of the front truss 12 and the back truss 14. Similar to the front and back truss, in a preferred embodiment, the side trusses 16 and 22 comprise spaced apart parallel tubes connected together by a Plurality of rods. Preferably, the side trusses 16/22 are affixed about half way up the leg portion 13 to increase the structural rigidity of the command post.

A first and second top truss member 18 and 20 respectively extend orthogonal to and are affixed between respective roof portions 15 of the front truss 12 and the back truss 14. Similar to the front and back truss members, in a preferred embodiment, the top truss members 18 and 20 comprise spaced apart parallel tubes connected together by a plurality of rods.

An end truss member 24 is affixed to and extends between the leg portions 13 of the back truss member 14. Again, similar to the front and back truss members, in a preferred embodiment, the end truss member 24 comprises spaced apart parallel tubes connected together by a plurality of rods.

A pair of horizontal table truss members 46a and 46b (FIG. 2 and 3) are affixed to and extend orthogonally from the end truss member 24. As shown in the figures, the horizontal table truss members 46a/b preferably extend substantially the entire length of the command post 10 at a height off the ground substantially equal to that of the end truss 24. A pair of table leg trusses 28a and 28b extend orthogonally from the bottom of the table truss members 46a/b to the ground to support the table truss members 46a/b along their span.

Figure 3:
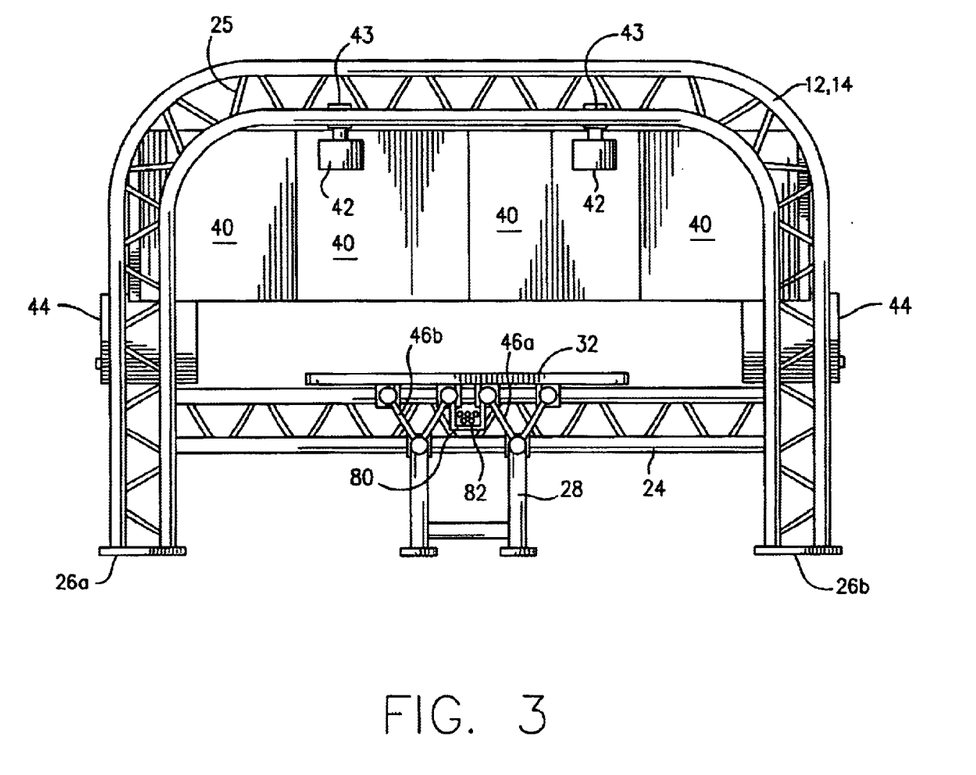
FIG. 3 is a front view of one embodiment in accordance with the present invention.
Figure 4:
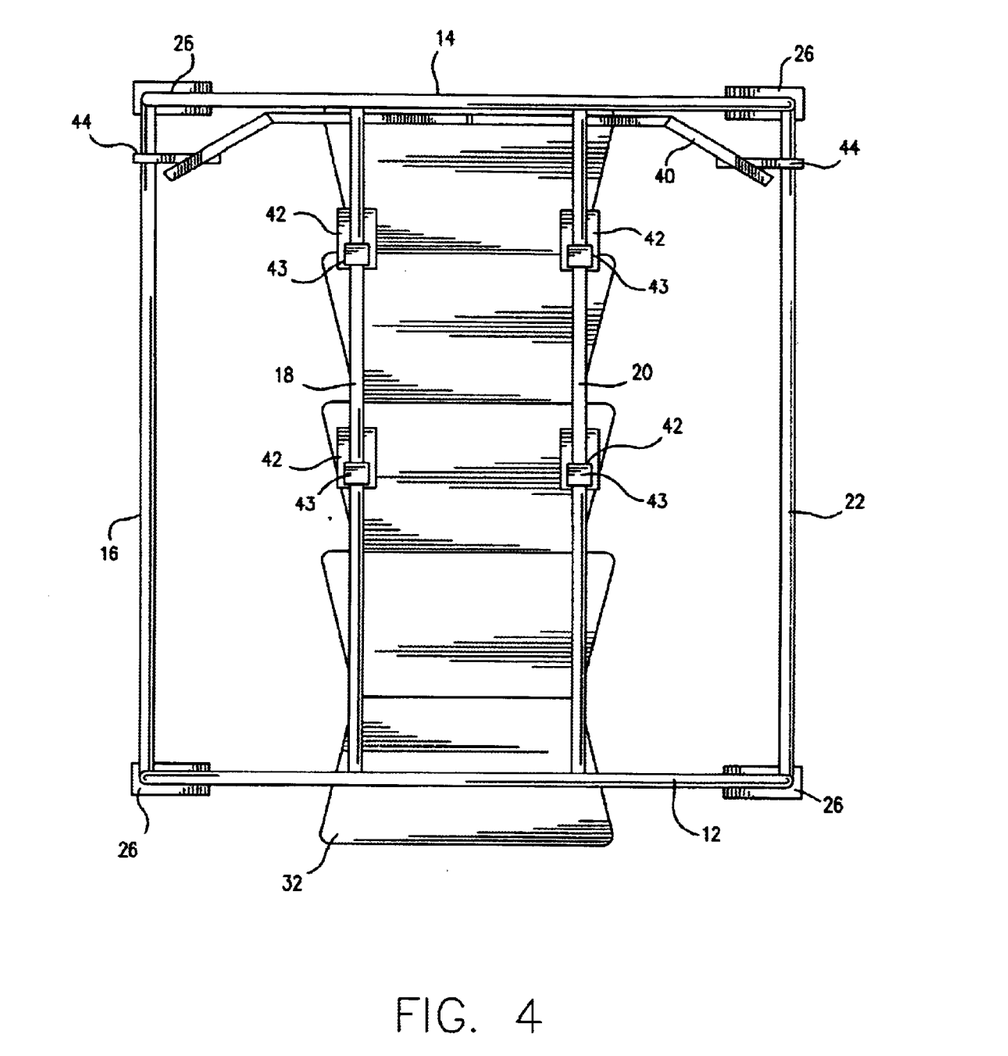
FIG. 4 is a top view of one embodiment in accordance with the present invention.

As shown in FIG. 3, the horizontal table truss members 46a/b preferably comprise a triangular shaped truss section. A plurality of table surfaces 32 are affixed to the horizontal truss members 46a/b in a predetermined pattern. In a preferred embodiment, the table surfaces 32 comprise a trapezoidal shaped surface. It has been found that a trapezoidal table shape allows for a large number of different table arrangements that may be easily configured depending on the needs of the users. To ease assembly and disassembly, the table surfaces are preferably removably affixed to the table truss members 46a b by releasable snaps or the like.

Affixed at each end of a truss member that interfaces with the ground is a pad 26. The pad 26 is configured to rest on the supporting surface like the ground and provide increased structural stability for the command post 10. In a preferred embodiment, the pad 26 is removably attached to a respective truss member and is further adjustable to align with uneven terrain. It is also desirable to provide a means for securing the pad 26 to the ground by, for example, stakes, spikes or the like.

A plurality of chairs 30 are arranged in a predetermined fashion depending in part on the layout of the table surfaces 32. As shown in FIG. 1, located at various points on each table surface 32 is electronic equipment which could include a computer monitor 34, a keyboard 36, a laptop computer 38 or the like. The chair 30 is configured to be broken down into smaller piece parts and arranged in a small package for storage and shipment to the site. In a preferred embodiment, the chair 30 comprises three legs 30a with a back rest 30b and a pair of arm supports 30c. Advantageously, the chair 30 is covered in a durable camouflaged material and is padded for increased comfort and reduced fatigue.

Affixed to the top truss members 18 and/or 20 by a projector mount 43 is a projector 42. In a preferred embodiment, the projector 42 is a ruggedized, lightweight, LCD type projector. The projector mount 43 extends down from the top truss members 18 and/or 22 and provides adjustment for the alignment of the projector 42. Preferably, the projector mount also provides a quick connect/disconnect method for attaching the projector 42 to a truss member.

A plurality of vertical viewing surfaces 40 are arranged in optical communication with a respective projector 42. Preferably, the vertical viewing surfaces 40 are removably affixed to the back truss 14 by known means and are further supported by a pair of side supports 44 that are affixed on side trusses 16 and 22. The side supports 44 are slidably affixed on the side trusses 16 and 22 and are adjusted to support the lower edge of the viewing surface 40.

In a preferred embodiment, a plurality of projectors 42a/b are affixed to the top trusses 18/20 and are in optical communication with a plurality of viewing surfaces 40. As shown in the figures, the viewing surfaces 40 can comprise a foldable surface for positioning portions of the viewing surface at different angles to better align that portion of the surface with a respective projector. In a preferred embodiment, the viewing surface 40 is removably affixed to the command post 10 and is foldable to reduce its overall size while being stored and transported. The horizontal viewing surface 40 is preferably made from a coated aluminum sheet that allows for viewing of a projected image and can also be used as a surface for attaching hard copy materials such as a map for viewing and writing on by the occupants.

The modular command post 10 employs soft-sided shelters, or tents, in field applications. The tents modularity, mobility, flexibility, and scalability enhance the use of the modular command post 10 and provides a weather tight shelter that is quickly assembled and disassembled. Through various combinations of the truss members that comprise the command post 10, the structure can be scaled and connected together in various configurations to meet the floor space requirements of shelters that corresponds to existing standard tent sizes. In a preferred embodiment, the command post system 10 uses Deployable Rapid Assembly Shelter (DRASH) tents manufactured by DRS Inc.

The tents for the modular command post system 10 were chosen based on size relevant to the frame and footprint of the command post system 10, available interior floor space, ease of assembly and disassembly, adaptability to multiple tent configurations, integration and fit with external equipment shelters, and the weight and footprint of the shelter when collapsed for storage and transportation. Representative tents selected for use in a preferred embodiment of the modular command post system 10 is detailed in the table below.

| Tent Designator | Dimensions | | Operator Positions Supported |
| --- | --- | --- | --- |
| | Interior (ft) | Exterior (ft) | |
| 4XB | 25.7 × 13.7 × 8.8 | 27.3 × 15.3 × 11 | Up to 10 |
| 1XBT | 8.8 × 13.7 × 8.8 | 9.7 × 15.3 × 11 | Entry Way |
| 4XBT | 20.8 × 13.7 × 8.8 | 21.7 × 15.3 × 11 | Up to 8 |
| 5XBT | 24.8 × 13.7 × 8.8 | 25.7 × 15.3 × 11 | Up to 8 |
| J | 34 × 31.4 × 12.4 | 35 × 34.2 × 18.3 | Up to 26 |

The modular command post system 10 embraces a "pack-and-go" system that consists of metal packing and transit cases, heavy-duty bags, and a wheeled trailer as the transportation medium. The metal packing and transit cases provide the requisite protection necessary for computer and electronic components, as well as any item that may be damaged during relocation. The heavy-duty bags simplify packing and transporting the truss structure. The trailer provides enough space to hold all components of the modular command post system 10 including the DRASH tent. Further, the trailer could be configured to provide integrated mobile electric power and environmental control units. When fully disassembled and packed away, the entire modular command post system 10 and its respective support services are transportable with a single appropriately sized vehicle.

The simplified pack-and-go system and modular nature of the modular command post system 10 reduces set-up and take-down times and requires minimal personnel. The packing methodology used ensures no individual item requires more than a two-person lift, and no more than four people are required to complete construction. The table below provides representative weight, size, and set-up/take-down times for various configurations of the modular command post system 10.

| Command Post Weight | DRASH MCP | Size (ft³) | Set-up DRASH Time | Take-down Time | Operator Positions Supported |
| --- | --- | --- | --- | --- | --- |
| 2400 lbs | 460 lbs | 14' × 25' × 8' | 35 | <120 min | <90 min | 10 |
| 400 lbs | 330 lbs | 8' × 12' × 8' | 27 | <45 min | <45 min | 6 |
| 1800 lbs | 460 lbs | 14' × 25' × 8' | 35 | <45 min | <45 min | 6 |
| 2000 lbs | 590 lbs | 14' × 25' × 8' | 41 | <90 min | <60 min | 10 |

Figures 5A, 5B:
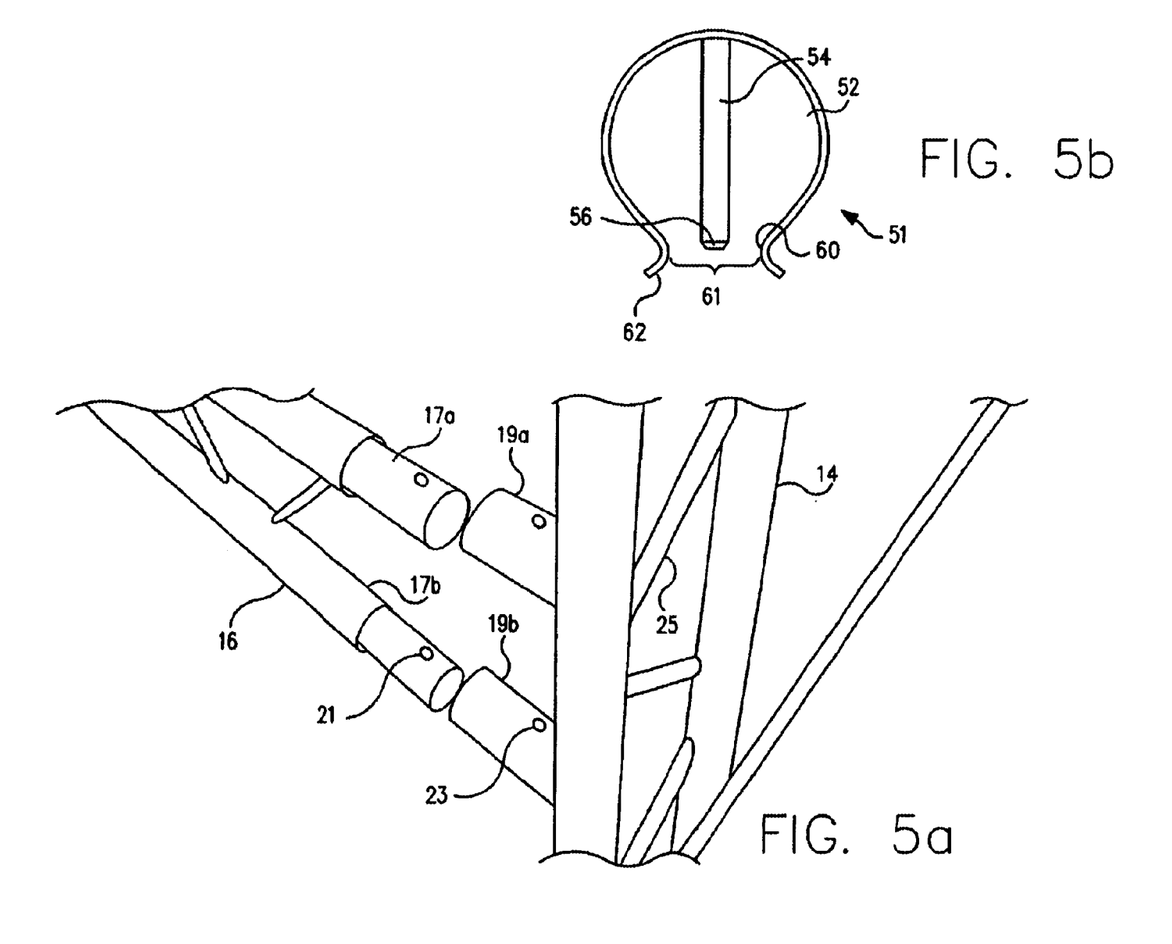
FIG. 5a is an isometric view of a connection in accordance with one embodiment of the present invention.
FIG. 5b is a plan view of a retainer assembly in accordance with one embodiment of the present invention.

Referring now to FIGS. 5a and 5b, the interconnection of the trusses will now be discussed in more detail. The various connection points of the command post 10 are preferably removably interconnected by a retainer assembly 51 that is removably affixed to the connection points of the different truss members that come together to form the command post 10.

As shown in FIG. 5a, protruding orthogonally from the front truss member 14 is a pair of receptacles 19a and 19b appropriately sized and placed to receive ends 17a and 17b respectively of the side truss member 16. In a preferred embodiment, when fully inserted in their respective receptacles 19, a hole in the each end 17a and 17b aligns with a hole on the corresponding receptacle 19a and 19b. The retainer assembly 51 is thus inserted into the aligned holes to secure the two truss members together.

The retainer assembly 51 is preferably comprised of a resilient clip 52 that is circular in shape and conforms substantially with the cylindrical profile of the truss members. In a preferred embodiment, the clip 52 is made from aluminum, spring steel, or the like. The clip 52 forms a gap 61 so it can be engaged on and slid over the truss members. As the retainer assembly 51 is installed onto a truss member, the clip 52 deforms by forcing the truss member into the gap 61. The clip 52 preferably has a pair of smooth edges 60 at each end of the gap 61 that allows the retainer assembly 51 to slide along the surface of the truss member without getting stuck.

Protruding diametrically from an inside surface of the clip 52 towards the gap 61 is an elongated cylindrical pin 54 with a chamfer 56 located at the pin's distal end. As the retainer assembly 51 is slid into position over a truss member, the pin 54 is inserted into, for example, the aligned holes 21 and 23. When fully seated around the truss member, the spring action of the clip 52 secures the placement of the retainer assembly 51 and locks the two truss members together. When the retainer assembly 51 is installed, side truss member 16 is releasibly affixed to the front truss member 14, and the retainer assembly 51 provides a low profile, reliable connection means. In a preferred embodiment, the pin 54 extends all the way through the receptacle 19, meaning a hole located at the bottom of the receptacle 19 is also provided and aligns with a respective hole in the bottom of the end 17. To remove the retainer assembly 51 during disassembly of the command post, a surface 62 is provided on the clip 52 which can be used by a hand or appropriate tool to force the clip.52 up and off of the truss member, where it will return to its original shape to be reused the next time the command post is erected.

It should be mentioned that myriad releasable connection means could be provided, for example, spring loaded detent pins, threaded fasteners or the like. All such modifications are fully contemplated by the present invention.

Figure 6A:
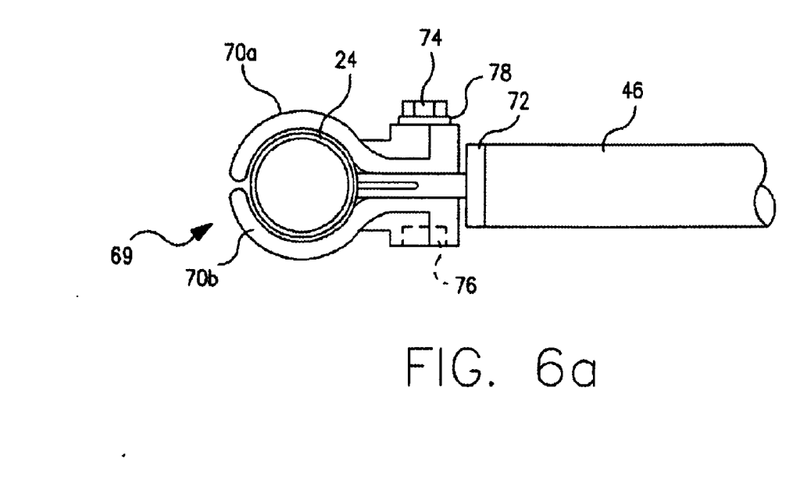
FIG. 6a is a end view of a connection means in accordance with one embodiment of the present invention.
Figure 6B:
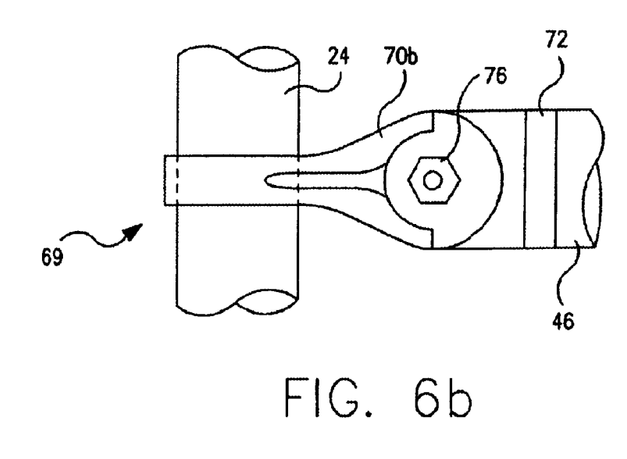
FIG. 6b is a top view of a connection means in accordance with one embodiment of the present invention.

Referring now to FIGS. 6a and 6b where attachment of the horizontal table truss 46 is shown connected to the end truss 24 by a clamp assembly 69. The clamp assembly 69 is advantageously located at the ends of the horizontal table trusses 46, thereby allowing the table trusses 46 to be connected to the end truss 24 at various locations depending on the desired layout of the table surfaces 32 in the command post 10.

Each clamp assembly 69 is comprised of a pair of opposed fittings 70a and 70b shaped to engage around a single tube of the end truss 24. The fittings 70a and 70b are affixed to a clevis 72 that protrudes from the end of a tube of the table truss 46. The clevis 72 extends between the fittings 70a and 70b, and a fastener 74 is inserted therethrough to secure the fittings 70a/b to the clevis 72. In a preferred embodiment, the clevis 72 is welded to the table truss 46. As shown in the figures, the fastener is preferably comprised of a threaded nut and bolt. To facilitate the attachment of the clamp assembly 69 by a single person, a recess 76 preferably in the shape of the nut is provided in one of the fittings. The nut is then placed in the recess 76, thereby allowing the installer to tighten the bolt without placing a wrench on the nut. An optional washer 78 is provided under the head of the fastener 74. The fittings 70a and 70b are shaped to clamp onto the end truss 24 as shown in FIGS. 6a and 6b when the fastener 74 is tightened.

Figure 7:
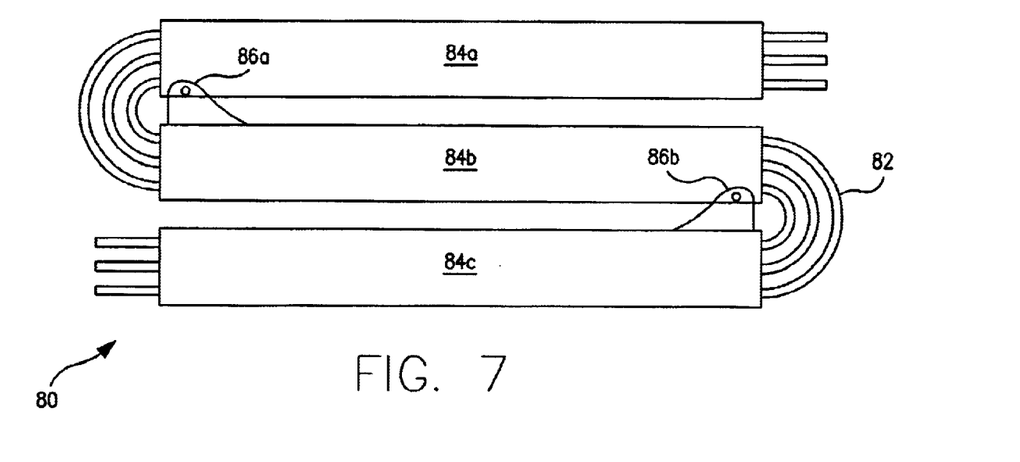
FIG. 7 is a side view of a foldable conduit structure in accordance with one embodiment of the present invention.

Referring to FIG. 7, a foldable electrical conduit structure 80 is shown in its folded configuration. As shown in FIG. 3, the conduit structure 80 is configured to be installed adjacent the horizontal table truss 46 to provide power and other cables to the various equipment that may be placed in the command post 10. The foldable conduit structure 80 comprises a plurality of pivotally connected enclosures 84a, 84b and 84c, which are configured to hold a plurality of wires 82 running therethrough. Joints 86a and 86b are provided as shown in FIG. 7 to allow each enclosure 84a–c to rotate to a closed or open position. The pre-assembled conduit structure 80 preferably contains all of the power, network, and video distribution interface cabling required in the command post 10. Additionally, the network hubs and external power supplies for laptop computers 38 are also contained within the conduit.

The use of an integrated, pre-assembled conduit structure 80 can provide many distinct advantages over standard field installation practices including:

A pre-assembled, pre-cabled conduit system reduces installation and removal times by eliminating the requirement to repetitively install and remove primary cabling interface(s).

All interface cabling is centrally housed and protected. With the conduit structure 80 elevated, interface failures due to trip hazards and environmental conditions are eliminated.

The Total Ownership Cost of the system is reduced based on increased life expectancy of the interface cabling.

When fully collapsed, a standard size conduit structure 80 can preferably fit in a 63"×15"×28" transit case for simplified storage and transportation.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A modular structure comprising:
    a front truss member having spaced apart front vertical leg sections and a front horizontal roof section;
    a back truss member having spaced apart back vertical leg sections and a back horizontal roof section, said back truss member spaced apart a predetermined distance from said front truss member;
    a plurality of side truss members affixed between said front and back truss members;
    a top truss member affixed between said front and back truss members;
    an end truss member affixed to said back truss member and extending between said back vertical leg sections;
    a table truss member affixed to said end truss member, said table truss member extending substantially orthogonal to said end truss member;
    a table leg truss member affixed substantially orthogonal between said table truss member and the ground;
    a table surface affixed to said table truss member.

2. A modular structure according to claim 1, further comprising a projector removably affixed to said modular structure.

3. A modular structure according to claim 1, further comprising a removable viewing surface in optical communication with said projector.

4. A modular structure according to claim 3, wherein a plurality of said projectors are in optical communication with a plurality of said viewing surfaces.

5. A modular structure according to claim 1, further comprising a collapsible chair configured to seat a person.

6. A modular structure according to claim 1, where said table surface is trapezoidal in shape.

7. A modular structure according to claim 1, further comprising a fabric shell substantially surrounding said modular structure.

8. A modular structure according to claim 1, further comprising a foldable electrical conduit structure disposed adjacent said table truss member.

9. A temporary shelter for use by military personnel comprising:
    a generally parallelpiped enclosure defined by a plurality of removably interconnecting truss members;
    a table support structure removably affixed to at least one of said plurality of removably interconnecting truss members and extending in said enclosure;
    a plurality of removable table surfaces disposed inside said enclosure and removably affixed to said table support structure;
    a plurality of collapsible chairs configured to be used in conjunction with a respective table surface;
    a removable viewing screen in optical communication with a removable projector disposed inside said enclosure.

10. A temporary shelter according to claim 9, further comprising a computer placed on said table surface.

11. A temporary shelter according to claim 9, wherein said table surface comprises a substantially trapezoidal shape.

12. A temporary shelter according to claim 9, further comprising a foot pad disposed at each corner between said enclosure and the ground.

13. A temporary shelter according to claim 9, wherein said truss members are removably interconnected by a plurality of retainer assemblies.

14. A temporary shelter according to claim 13, wherein said retainer assembly further comprise a snap-on flexible clip affixed to an elongated pin, said pin configured to be removably inserted into aligned holes of mating truss members.

15. A method for providing a temporary shelter comprising the steps of:

provide a front truss member having spaced apart front vertical leg sections and a front horizontal roof section;

providing a back truss member having spaced apart back vertical leg sections and a back horizontal roof section;

placing said back truss member a predetermined distance from said front truss member;

providing a plurality of side truss members removably affixed between said front and back truss members;

providing a top truss member removably affixed between said front and back truss members;

providing an end truss member removably affixed to said back truss member and extending between said back vertical leg sections;

providing a table truss member removably affixed to said end truss member, extending said table truss member substantially perpendicular to said end truss member;

providing a table leg truss member removably affixed substantially perpendicular between said table truss member and the ground;

providing a table surface removably affixed to said table truss member.

16. A modular command post system comprising:

a collapsible three dimensional truss structure defining a volume therein;

a table support structure removably affixed to said truss structure and extending in said volume;

a plurality of horizontal work surfaces removably affixed to said table support structure;

a foldable electrical conduit structure disposed along said table support structure, said conduit structure routing a plurality of wires through said volume;

a plurality of removable vertical work surfaces disposed in said volume.

17. A modular command post system according to claim 16, wherein a plurality of said command post systems are connected together.

18. A modular command post system according to claim 16, wherein said truss structure comprises a pair of spaced apart and parallel thin walled pipes connected together by a plurality of rods.

19. A modular command post system according to claim 16, wherein said table support structure comprises a triangular truss made from three spaced apart cylindrical tubes connected together by a plurality of rods.

20. A modular command post system according to claim 16 further comprising a collapsible conduit structure disposed adjacent said table support structure.

* * * * *